United States Patent Office 3,065,641
Patented Nov. 27, 1962

3,065,641
TWO-AXIS SUBMINIATURE RATE GYROSCOPE
John C. Stiles, Morristown, N.J., assignor to General Precision Inc., Little Falls, N.J., a corporation of Delaware
Filed June 2, 1960, Ser. No. 33,460
12 Claims. (Cl. 74—5)

This invention generally relates to improvements in gyroscopes, and more particularly to improvements in a rate gyroscope having two degrees-of-freedom.

This invention is particularly concerned with the accurate measurement of the rate of change in attitude of a high speed aircraft or missile, although the invention is not limited to such application, and it is accordingly, a primary object to provide miniature two-degree-of-freedom gyroscopes of small volume and weight and a minimum of complexity.

The use of fluid suspended and viscously damped gyros for the control of high speed aircraft and related applications requiring great precision has become wide-spread because of the many advantages provided by the fluid. Among others, the fluid serves as a cushion to protect the delicate gyro parts and bearings against shock and acceleration; it buoyantly floats the gyro mechanism, removing weight from the bearings or other suspending means; and it provides an almost ideal manner of obtaining viscous restraint for rate integrating purposes. However, due to the many difficulties in pivotally suspending the gyro by means of gimbals and the like to provide two degrees-of-freedom with the required accuracy, it has become a common practice to employ single degree-of-freedom floated gyros for precision purposes and very rarely, if ever, have the advantages of fluid suspension and damping been employed in a gyro capable of measuring attitude and rate about two mutually perpendicular axes. As a result, in applications requiring such measurement about more than one flight axis, it has become customary to employ a plurality of single axis gyroscopes, each oriented with its sensitive axis along a different flight axis. Such multiple gyro systems are necessarily quite complex and heavy and occupy considerably more volume for aircraft uses than is desirable. Furthermore, the increased weight and size necessitates disproportionate increases in the size and weight of the supporting and control equipment for the gyros, not to mention the increased power requirements, electrical connections, wiring, and the like.

To overcome these disadvantages, according to the present invention, there is provided both an improved rate gyro having fluid suspension and damping, and an improved rate gyro not requiring fluid suspension, both of which are provided with two degrees-of-freedom; or in other words, are capable of measuring displacement and rate-of displacement about two mutually perpendicular axes. Consequently, a single gyro, according to the present invention, is adapted to replace two single degree-of-freedom gyros in high speed aircraft and related applications requiring precision measurements.

According to one preferred form of the present invention, the improved rate gyro is generally comprised of sealed inner and outer containers with a fluid filling the space in between the two containers and serving to both buoyantly suspend the inner container and provide viscous friction during displacement of the inner container about either of two mutually perpendicular axes. The inner container is effectively stabilized to provide a substantially fixed axis in space by means of a rapidly rotatable gyro rotor therein. To enable relative pivoting between the gyro container and the outer container with two-degrees-of-freedom, there is provided a single flexible pedestal supporting the gyro container in such a manner as to provide a flexure suspension that is substantially free of friction, wear, and play, thereby eliminating the main source of error associated with known gimbal supported two-degrees-of-freedom gyros. In addition to these advantages, the unique manner of suspending the inner gyro container does not render the gyro unduly sensitive to accelerational forces, since the buoyant force being provided by the fluid substantially maintains the inner gyro container weightless. In addition to these features, there is also provided an automatically operating means for varying the center of mass of the inner gyro container responsively to variations in the temperature of the immersing fluid, thereby to substantially maintain the gyro insensitive to acceleration forces despite changes in the density of the fluid.

According to a second embodiment of the invention, there is provided an improved rate gyroscope construction having two-degrees-of-freedom, that is also substantially immune from friction, wear, and play. Although this rate gyro may be characterized as being of the mechanical variety, a preferred form thereof does not employ either bearings or jewels for pivoting suspension thereof, but, in common with the floated rate gyro construction, employs an improved variety of flexure type suspension.

It is, accordingly, one object of the invention to provide an improved fluid suspended and damped miniature gyro having two degrees-of-freedom.

Another object is to provide miniature two degrees-of-freedom rate gyros of reduced weight, volume, and complexity.

A still further object is to provide an improved flexure suspension for rate and position gyros.

Another object is to provide automatically operated means for compensating for the change in density of the fluid in a floated gyro construction.

Other objects and many additional advantages will be more readily comprehended by those skilled in the art after a detailed consideration of the following specification taken with the accompanying drawings wherein:

FIGURE 3 is a sectional view taken along lines 3—3 of FIGURE 1 and illustrating details of the signal pickoff.

Figure 1:
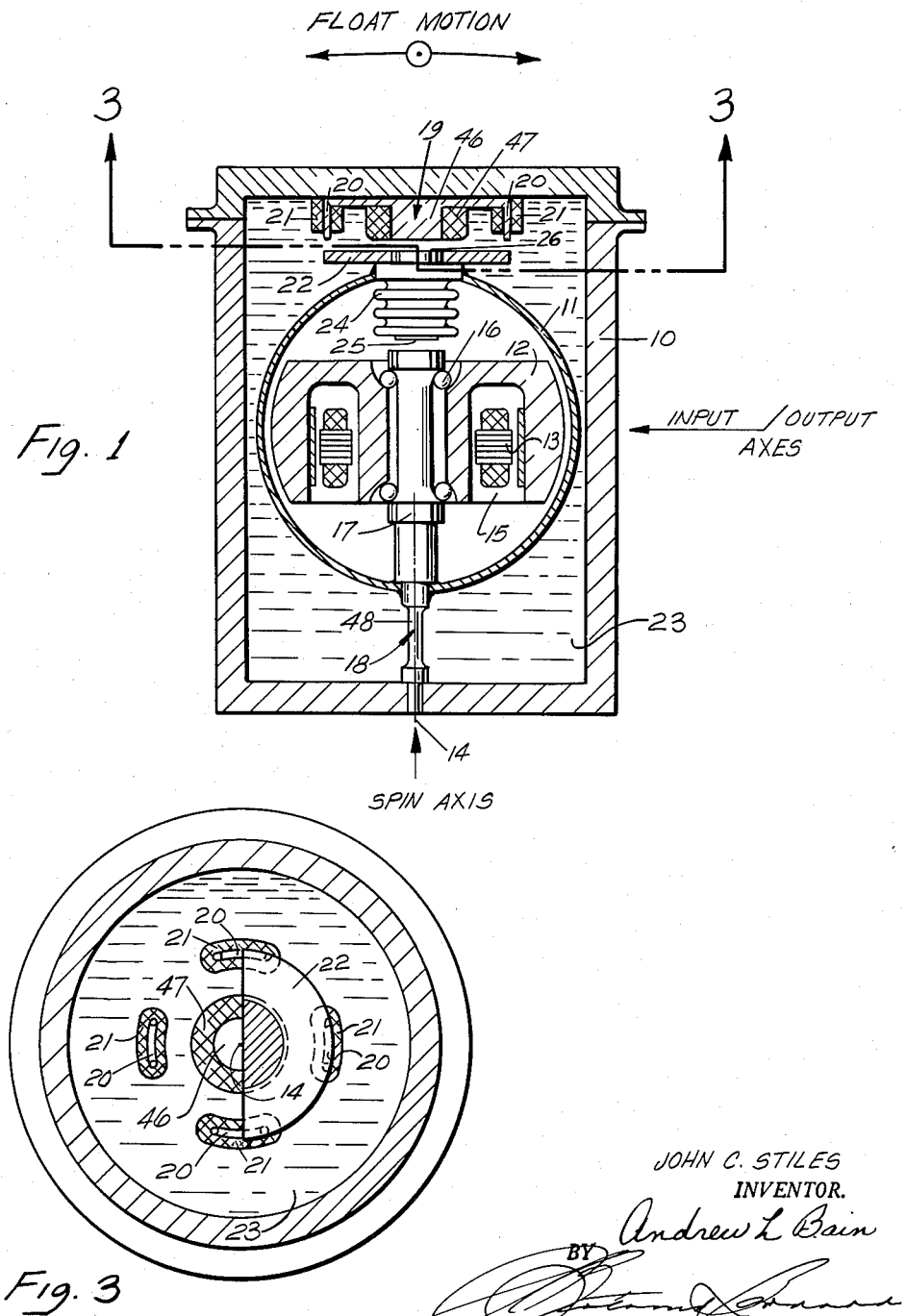
FIGURE 1 is a cross-section view illustrating one preferred embodiment of a floated rate gyro according to the present invention.

Referring initially to FIGURE 1 for a consideration of a preferred rate gyro according to the present invention, there is generally shown a fluid-tight outer hollow housing 10 within which is contained a generally spherically-shaped hollow gyro container 11. Within the gyro container 11, there is rotatably supported a gyro rotor 12 which may be generally formed in inverted cup-shape, as shown, and adapted to be driven at high speed about its central spin axis 14 by means of motor windings 13 that are suitably supported on a stator frame 15 fixedly attached to the gyro container 11 (attaching means not shown).

More specifically, the rotor member 12 is centrally supported by anti-friction bearings 16 which, in turn, are carried by a central upright shaft structure, generally designated 17, that is fixedly supported by the inner gyro container 11 to define the rotor spin axis 14.

The gyro container 11 is normally positioned symmetrically upright within the outer hollow housing 10 by means of an elongated reduced diameter flexure beam 18, whose upper end is fastened to the base of the gyro inner container 11 and whose lower end is fastened centrally to the floor of the hollow housing 10, as shown. The lengthwise axis of flexure beam 18 is disposed coaxially with the spin axis 14 of the gyro rotor 12 thereby to provide a more compact gyro assembly and enable the gyro rotor to possess a maximum of momentum when spinning.

The flexure beam 18 is preferably formed of a unitary solid cylinder of resilient spring metal of high length to diameter ratio to permit flexing or pivoting displacement between the inner gyro container 11 and the outer housing 10 about any axis transverse to the spin axis 14. Consequently, when the inverted cup-shaped rotor 12 is being rotated at high speed about axis 14, by energizing the motor windings 13, it serves as an effective gyroscope tending to maintain its same orientation in space despite tilting or pivoting of the outer housing 10 about any axis perpendicular to the spin axis 14. Any such tilting or pivoting of the outer housing 10 merely serves to flex flexure column 18, thereby providing a universally pivotable joint between the gyro container 11 and outer housing 10. The limits of such flexure are, of course, determined by the clearances existing between the outer surfaces of the gyro container and the inner wall of the outer housing 10.

To provide electrical signals proportional to relative displacement between the gyro container 11 and the outer housing 10 about two perpendicular axes, both transverse to spin axis 14, there is provided a two-axis pickoff means which may comprise a four arm E-bridge arrangement generally designated 19, having a portion supported inside the outer housing 10 and above the gyro container 11.

As best shown in FIGURE 3, this two-axis pickoff may comprise an E-frame consisting of two pairs of opposed poles 20 of magnetic material each pair facing one another and on opposite sides of a central pole 46 and each carrying a magnetic winding 21 thereon and the central pole 46 supporting magnetic winding 47. In magnetic proximity thereof there is provided a flat circular disc armature member 22 of magnetic material carried at the top of gyro container 11 and spaced closely to the pickoff frame 19. In operation, the winding 47 on the central pole 46 is energized by an alternating current voltage and the four peripherally spaced windings 21 are inductively coupled thereto by the armature 22. When the housing 10 and gyro container 11 are in symmetrical alignment, the magnetic armature 22 is symmetrically positioned with respect to the four outer windings 21 and the signals induced in the windings are alike, indicating no displacement. However, relative tilting between the gyro container 11 and the outer housing 10 displaces the armature 22, with respect to the outer windings 21, thereby inducing different signals on the various windings 21 proportional to the relative displacement about each axis individually.

As thus far described, therefore, there is provided a two degree-of-freedom gyro, comprising a stabilized inner gyro container 11 and an outer housing 10 together with flexure means 18 enabling two degrees of relative displacement therebetween, and pickoff means 19 for measuring the displacement about each of two perpendicular axes. However, with this arrangement, it is evident that the gyro container 11 and flexure column 18 resemble an inverted pendulum and hence would also be sensitive to acceleration forces acting along all horizontal axes transverse to the spin axis 14. For the purpose of minimizing this acceleration sensitivity, as well as providing viscous restraint and other desirable features, there is provided a buoyant fluid 23 within the outer housing 10 which substantially fills the outer housing 10 and fully immerses the gyro container 11. The fluid is selected to possess a density sufficient to provide a buoyant force on the gyro container 11 substantially equal to the weight of the gyro container 11, whereby the gyro container 11 is rendered substantially weightless insofar as its downwardly acting weight or force on the flexure column 18 is concerned. Additionally, the fluid 23 is selected to have a viscosity in the range desired thereby to provide a viscous restraining force acting upon the gyro container 11 to restrain relative movement between the container 11 and the outer housing 10, whereby the overall gyro construction functions in the manner of a damped rate gyro. Suitable fluids to perform this floated and restraining function are well known to those skilled in the art and a more detailed description thereof is considered unnecessary.

In the construction of this gyro, it is also understood that the center of gravity of the inner gyro container 11 and its enclosed members is preferably located at the position 48 on the flexure column where the pivoting action takes place or as close to this location as can be obtained using precision manufacturing techniques.

As thus far described, it is observed that since the gyro container 11 is symmetrically formed about spin axis 14 and balanced by the buoyant force of the fluid to provide a substantially weightless member at the upper end of flexure column 18, the gyro is substantially insensitive to acceleration forces. However, this condition remains true only when the gyro container is "floated." On the other hand, when the density of the fluid changes with variations in temperature, the balanced condition also varies, thus rendering the gyro acceleration sensitive. Since the gyro is intended for use in aircraft and other applications experiencing a wide range of temperature variations, this undesirable change in sensitivity could be nullified by providing a regulator including heating coils or the like about the outer housing 10 to always maintain the temperature of fluid 23 constant, despite changes in the outer temperature. However, such constant temperature controlling means for the fluid 23 adds considerable weight and complexity and consequently, according to the present invention, there is provided a more lightweight and less complex means for performing this function.

Referring again to FIGURE 1, there is provided an expandable bellows member 24 fastened within the gyro container 11 and carrying a weight 25 on its lower wall. The upper end of the bellows 24 is open to the fluid 23 at position 26 whereby the fluid 23 enters and fills the bellows 24. When the fluid 23 expands and becomes less dense, the bellows 24 will also expand in exact proportion, since the fluid is substantially incompressible. This proportionally reduces the internal volume of the portion of the gyro container 11 surrounding the bellows to again balance the container 11 in the fluid 23, which surrounds the container. To compensate for the change in the center of mass of the gyro container 11 with the changing volume of the interior thereof due to expansion and contraction of the bellows 24, the weight 25 is also positioned upwardly and downwardly along the spin axis 14 by the bellows movement, whereby the net result is to maintain the container 11 properly balanced within the fluid 23.

The container is not "floated" in the fluid. It is balanced at all times, so that no torques are exerted on the container under acceleration.

Normally the center of gravity of the container, and the center of buoyancy thereof coincide on the axis 14.

Thus if the unit is accelerated, there will be no torques on the container, if the container is perfectly floated.

As the temperature of the fluid increases, the container will not be perfectly floated, but the container will weigh more than the fluid it displaces.

The container is supported by the flexure column 18, unless a torque is generated.

Under these conditions, an undesirable, or error torque will be introduced in the container.

An equal and opposite torque is provided by moving the C.G. of the container so that it no longer coincides with the center of the buoyancy.

The motion of the center of gravity of the container is proportional to the temperature of the fluid.

Thus, according to one embodiment of the present invention, there is provided a miniature two-degree-of-freedom gyro that is floated and elastically and viscously restrained, and is automatically compensated for temperature variations.

According to a second preferred embodiment of the invention, there is provided a non-floated two-degree-of-freedom gyro of miniature weight and volume for measuring rate of displacement about two axles or with two-degrees-of-freedom.

Figure 2:
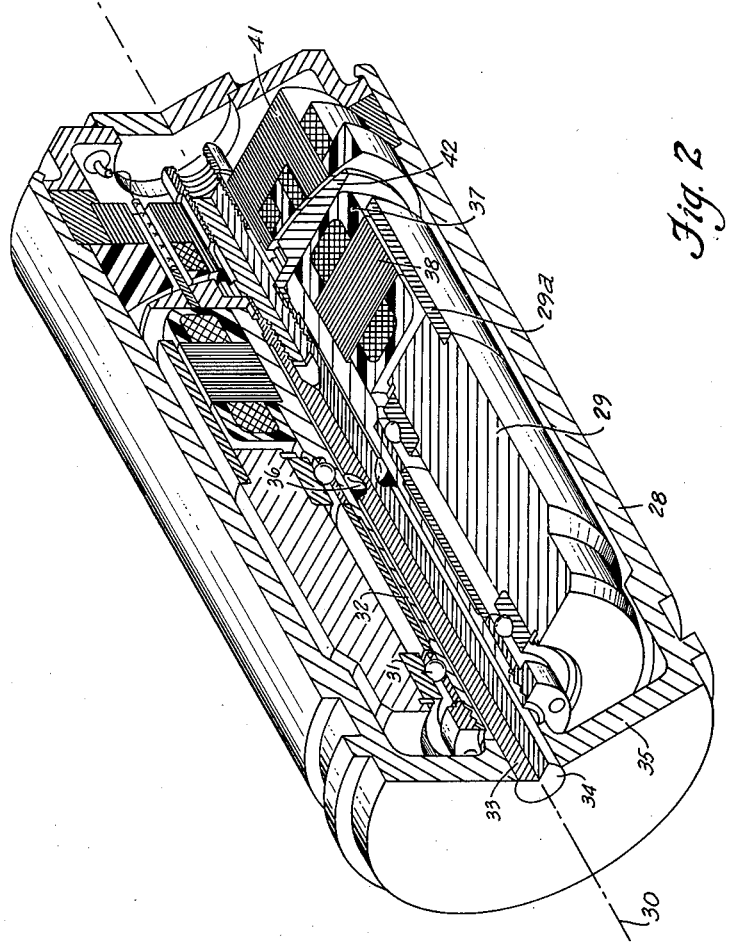
FIGURE 2 is a modified perspective view, partially in section illustrating a preferred non-floated rate gyro construction according to the present invention.

Referring to FIGURE 2, the preferred rate gyro comprises an elongated substantially cylindrical outer housing 28 within which is contained an elongated cylindrically-shaped rotor member 29 rotatably mounted about the central axis 30 passing lengthwise through the housing 28.

The rotor 29 is rotatably supported by means of anti-friction bearings 31, the inner races of which are fitted to a central elongated hollow sleeve member 32 disposed lengthwise through the housing 28 and coaxial with axis 30, as shown. The upper end of the hollow sleeve 32 is fitted to and rigidly held by an elongated substantially cylindrical shaft 33, passing coaxially through the sleeve 32, and free thereof, except at the upper end of the shaft, and having its lower end 34 tightly fitted into or otherwise fastened to a boss at the base 35 of the housing 28. The upper end of shaft 33 is not fastened to the housing 28.

About midway along the length of the supporting shaft there is provided a necked portion 36 of circular cross-section, thereby to enable flexure of the shaft thereabout. Since the shaft 33 is anchored at its base in the housing 28, but free at the top, this uniformly necked portion 36 enables flexure about any axis transverse to its lengthwise axis 30.

Recapitulating the structure as thus far described, there is provided centrally within the outer housing 28, an upright shaft 33 whose base portion 34 is affixed in the floor 35 of the housing. The upper end of shaft 33 is free and supports an elongated hollow sleeve member 32 that extends coaxially downward along the length of the shaft 33, an elongated pilot section at the upper end of the shaft being fitted to the interior of the hollow sleeve 32. The sleeve 32, in turn, rotatably supports the gyro rotor 29, which is preferably also in elongated cylindrical configuration extending coaxially along axis 30. Thus the gyro rotor 29 is adapted to be rotated about its inner sleeve 32, defining the spin axis 30. To permit angular displacement of the gyro rotor 29 with respect to the housing 28 with two-degrees-of-freedom, the central upright shaft 33 is provided with a necked portion 36 of circular cross-section, whereby the gyro rotor 29 and the sleeve 32 are tiltable with respect to the housing by flexing of the shaft 33 about its necked portion 36.

For rotating the gyro rotor 29, there is provided field windings 37 that are wound around a motor laminated pole structure 38 supported coaxially about the upper portion of the hollow sleeve member 32. These motor windings 37 and field pole structure 38 are accommodated coaxially within an extended hollow cylindrical portion 29a of the gyro rotor 29, whereby the rotating magnetic field being produced by the windings, reacts with the rotor portion 29a to rapidly spin the gyro rotor.

Positioned above the motor field windings 37 and spaced from the gyro motor assembly, there is provided the electrical pickoff signal device, generally identified as 41, and comprising a plurality of E-bridge poles and windings as generally discussed above in connection with FIGURE 1. These E-bridge windings are positioned to detect deflection of the gyro rotor assembly about either horizontal axis transverse to the gyro spin axis 30. Co-operating with the E-bridge windings to produce the electrical signals, there is provided a circular disc member 42 supported by the gyro rotor assembly above the motor field windings 37, as shown.

The space between members 41 and 42 is filled with a viscous fluid for the purpose of damping the motion of the gyroscopic element. The fluid is retained in this space by its surface tension. The viscosity of such fluids increases with decreasing temperature, thus varying the damping characteristics. This undesirable effect can be eliminated by the use of heaters, but it is preferred to chose the materials of the gyro so that the gap between members 41 and 42 will increase with decreasing temperature. This will occur if the housing 28 has a smaller coefficient of thermal expansion than the shaft 33. With proper choice of materials, the variation in the damping gap can be made to compensate for the variation in viscosity of the damping fluid, thus rendering the net damping effect constant over a substantial range of temperatures.

What is claimed is:

1. In a rate gyro, an outer housing, a container disposed within the outer housing, an inertia element rapidly rotatable about a spin axis within the container, means pivotally supporting said container within said outer housing for displacement about a pair of axes mutually perpendicular to each other and to the spin axis, a fluid within the outer housing for buoyantly supporting the container and viscously restraining pivotal movement thereof about said mutually perpendicular axes, and a pickoff means responsive to pivoting displacement of said container with respect to the outer housing about both mutually perpendicular axes for generating signals proportional to the displacement, said pivotal supporting means including flexure means interconnecting the container and outer housing, said container being hermetically sealed, and means responsive to the density of the fluid in the outer housing to vary the center of mass of the container.

2. In a rate gyro, an outer housing, a container disposed within the outer housing, an inertia element rapidly rotatable about a spin axis within the container, means pivotally supporting said container within said outer housing for displacement about a pair of axes mutually perpendicular to each other and to the spin axis, a fluid within the outer housing for buoyantly supporting the container and viscously restraining pivotal movement thereof about said mutually perpendicular axes, a pickoff means responsive to pivoting displacement of said container with respect to the outer housing about both mutually perpendicular axes for generating signals proportional to the displacement, said pivotal supporting means including flexure means interconnecting the container and outer housing, said container being hermetically sealed, means responsive to the pressure of the fluid as the volume of the fluid varies in the outer housing due to temperature variations to vary the center of mass of the container, said fluid pressure responsive means including a mass within the container and means responsive in the pressure of said fluid for variably displacing said mass within the container.

3. In a rate gyro, an outer housing, a container disposed within the outer housing, an inertia element rapidly rotatable about a spin axis within the container, means pivotally supporting said container within said outer housing for displacement about a pair of axes mutually perpendicular to each other and to the spin axis, a fluid within the outer housing for buoyantly supporting the container and viscously restraining pivotal movement thereof about said mutually perpendicular axes, a pickoff means responsive to pivoting displacement of said container with respect to the outer housing about both mutually perpendicular axes for generating signals proportional to the displacement, said pivotal supporting means including flexure means interconnecting the container and outer housing, said container being hermetically sealed, means responsive to the variations in pressure of the fluid as the fluid volume varies in the outer housing due to temperature variations, to vary the center of mass of the container, said fluid pressure responsive means including a mass within the container and means responsive to the variations in pressure of said fluid for variably displacing said mass within the container.

4. A rate integrating gyro having two degrees-of-freedom comprising a sealed container, a gyro rotor within said container and rapidly rotatable about a spin axis therein, an outer housing enclosing said container, a fluid within said outer housing for buoyantly supporting said container, flexure means interconnecting said outer housing and said container for enabling the tilting of said container within said outer housing about mutually perpendicular axes coordinate to said spin axis, and pickoff means responsive to relative tilting of said container and outer housing about said coordinate axes to generate signals proportional to the displacement of the container, said flexure means comprising a single shaft, including a necked down section of circular cross-section.

5. A rate gyro comprising an inertia means adapted to define a stable axis in space and including an inertia element rotatable about a spin axis, a supporting member, pickoff means having a fixed part attached to the support member and a movable part attached to the inertia means, a flexure means comprising a single shaft including a reduced diameter portion of circular cross-section, said flexure means interconnecting said inertia means and said support member, and a viscous fluid buoyantly supporting said inertia means with respect to said support member, the center of mass of said inertia means and flexure being located at said reduced diameter portion of said single shaft.

6. In the gyro of claim 5, means responsive to the density of the fluid for varying the center of mass.

7. In the gyro of claim 5, the axis of said shaft and the stable axis in space defined by said inertia means being normally co-axial in the absence of external tilting deflection of said support member.

8. In the gyro of claim 5, said inertia means including a mass, and means responsive to the variations in pressure of the fluid for variably displacing said mass with respect to said inertia element.

9. A rate gyro comprising an inertia means including an inertia element rotatable about a spin axis, a support member, pickoff means having a fixed portion attached to the support member and a movable portion attached to said inertia means, flexure means interconnecting said inertia means and said support member, a viscous fluid buoyantly supporting said inertia means with respect to said support member, the center of mass of said inertia means and flexure means being located at said flexure means, and means responsive to the density of the fluid for varying the center of mass of said inertia means and flexure means.

10. In the gyro of claim 9, said inertia means including a mass member, and means responsive to the variations in pressure of the viscious fluid for variably displacing said mass member with respect to said inertia element.

11. A rate gyro comprising an inertia means for defining a stable axis in space and including an inertia element rotatable about a spin axis, a support member, pickoff means having a fixed portion attached to the support member and a movable portion attached to the inertia means, a column having a flexure portion for interconnecting said inertia means and said support member and enabling flexure of said inertia means about all axes transverse to said column, a viscous fluid buoyantly supporting said inertia means with respect to said support member, the center of mass of said inertia means and deflectable portion of said column being located at said flexure portion of said column, and means responsive to the density of the viscous fluid for varying the center of mass of said inertia means.

12. In the gyro of claim 11, said density responsive means including a bellows having one end thereof in communication with said viscous fluid and the other end thereof within said inertia means, and a mass member supported by the end of the bellows within the inertia means.

References Cited in the file of this patent

UNITED STATES PATENTS

| | | |
|---|---|---|
| 2,452,335 | Stoner | Oct. 26, 1948 |
| 2,650,502 | Lundberg et al. | Sept. 1, 1953 |
| 2,868,023 | Bonnell | Jan. 13, 1959 |